Figure 5:
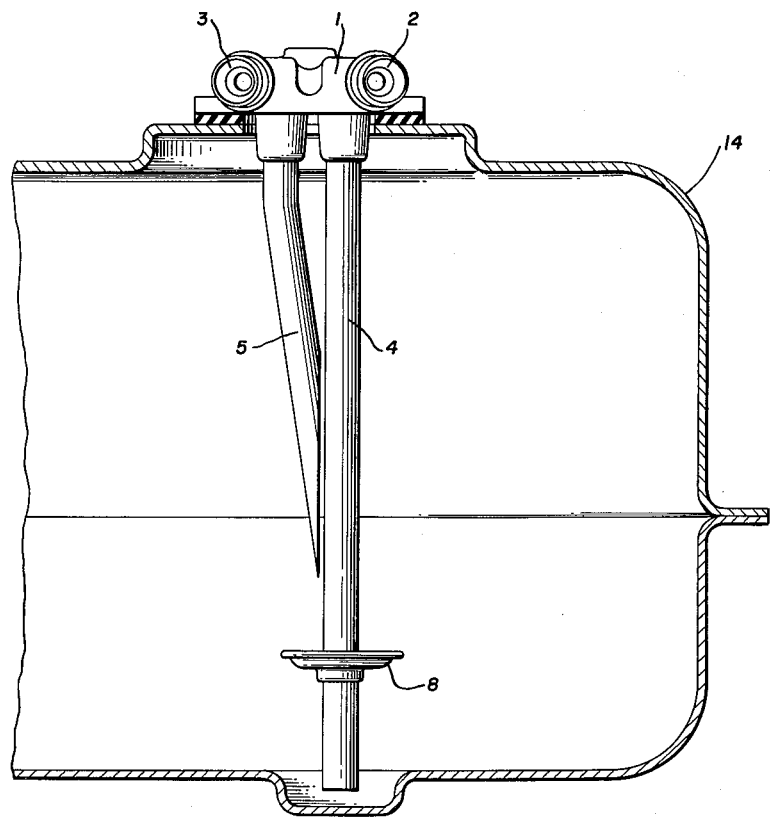

May 9, 1961 U. W. P. ANDERS 2,983,311
FUEL-TANK CONNECTING ASSEMBLY
Filed Nov. 13, 1956 2 Sheets-Sheet 1
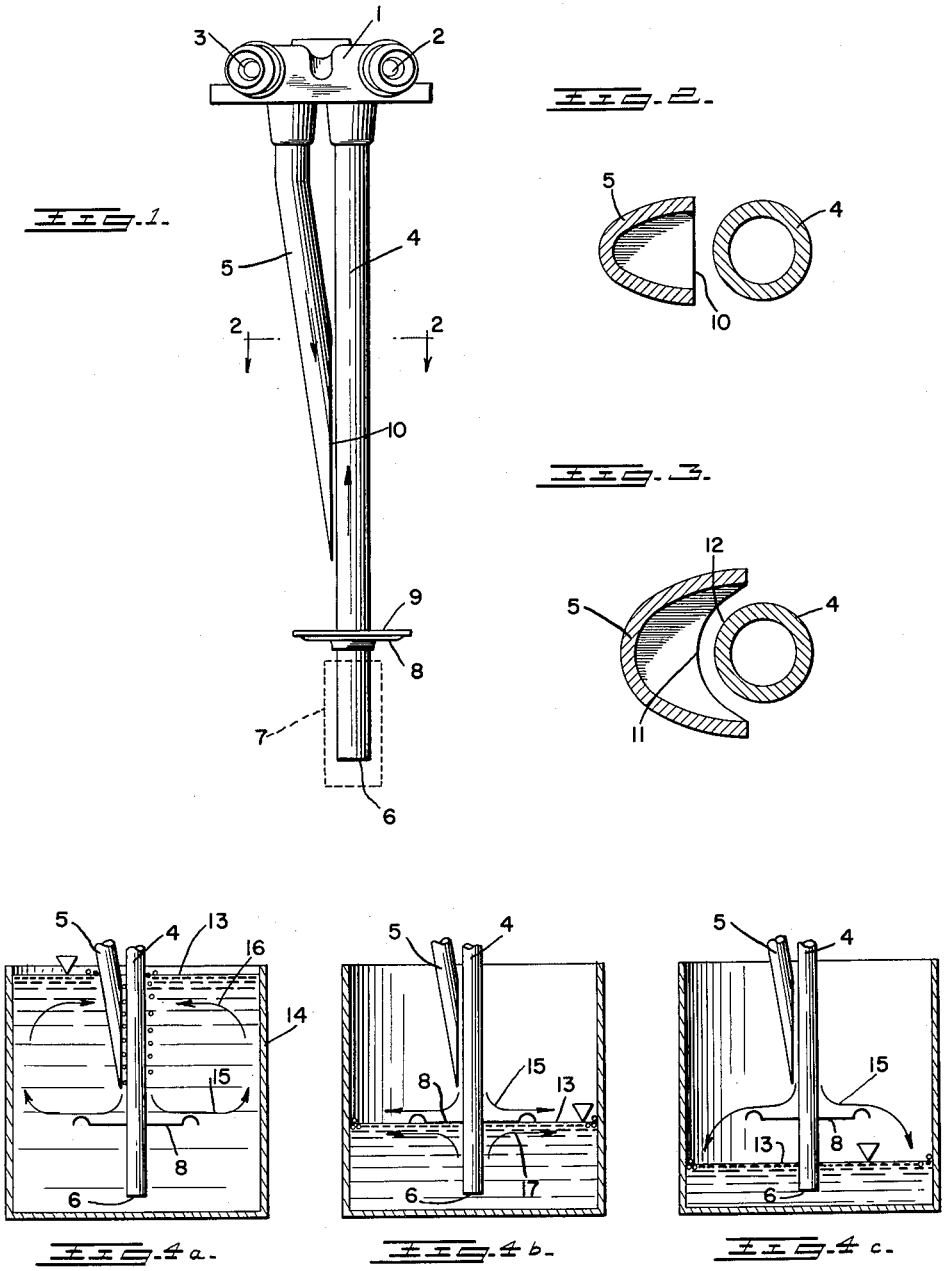
INVENTOR
ULRICH W. P. ANDERS
BY Dicke and Craig.
ATTORNEYS May 9, 1961 U. W. P. ANDERS 2,983,311
FUEL-TANK CONNECTING ASSEMBLY
Filed Nov. 13, 1956 2 Sheets-Sheet 2

INVENTOR.
ULRICH W. P. ANDERS
BY Dicke and Craig
ATTORNEYS

United States Patent Office 2,983,311
Patented May 9, 1961

2,983,311

FUEL-TANK CONNECTING ASSEMBLY

Ulrich W. P. Anders, Stuttgart-Unterturkheim, Germany, assignor to Daimler-Benz Aktiengesellschaft, Stuttgart-Unterturkheim, Germany Filed Nov. 13, 1956, Ser. No. 621,820

Claims priority, application Germany Nov. 15, 1955

7 Claims. (Cl. 158—46)

The present invention relates to a fuel tank connecting assembly for the removal of fuel from fuel tanks in motor vehicles, and more particularly to the arrangement of the feed and return lines formed by an assembly connected in the fuel tank of motor vehicles driven by injection-type internal combustion engines wherein the feed or suction line as well as the return line extend from above downwardly into the fuel tank.

It has been recognized, particularly in internal combustion engines utilizing fuel injection systems, that there is an undesirable tendency for the unused mixture consisting of fuel and air which is returned through the return line into the fuel tank in proximity of the orifice or inlet aperture of the suction line, to be sucked or drawn in thereat together with the remaining fuel by the fuel supply pump and thereby causes irregular operation or running of the internal combustion engine via the fuel injection pump due to the presence of varying amounts of air in the injected fuel.

Accordingly, with fuel containers or tanks for injection-type combustion engines it has been proposed in the prior art to provide an arrangement in which the suction line and the return line mutually face each other, i.e., an arrangement in which the suction line and return line are face to face, and wherein the return line discharged into the fuel tank from above and the suction line from below and, both orifices or discharge apertures were combined through a line extending through the tank and provided with a vent aperture.

Furthermore, prior art arrangements are known in which the suction and return lines which are led into the fuel tank from below are separated by a separating wall.

However, as in vehicles, especially passenger motor vehicles with the fuel tank located in the rear part of the vehicle, on the one hand, an appropriate and advantageous access to the fuel tank is only possible from above, and, on the other, the constructional combination of the suction line and return line into a unitary structure materially reduces difficulties encountered with satisfactorily sealing the joints in the tank and also simultaneously decreases the cost of manufacture, the present invention proposes to arrange the discharge aperture of the return line in proximity of the suction line and facing the same Such an arrangement offers the advantage that the mixture returned through the return line into the fuel tank and consisting of fuel and air reaches the suction line near the inlet aperture of the suction line, surrounds the same and the admixed air flows off along the suction line and then recombines itself with the remaining fuel in the tank.

For that purpose, the plane of the discharge aperture of the return line may be arranged at least approximately parallel to a plane extending through the center longitudinal axis of the suction line. Furthermore, for purposes of achieving a good discharge of the return line every portion of the discharge-aperture cross-section of the return line may be located at least approximately at a constant distance to the circumference of the suction line.

Particularly favorable operation conditions are obtained if the suction line, according to another feature in accordance with the present invention, is provided below the discharge aperture of the return line with an essentially horizontally extending deflection plate which is traversed centrally by the suction line, while the deflection plate is appropriately provided along the outer edge thereof with an upwardly directed bulge, formed, for example, by a corrugation, bead or the like, which are directed upwardly.

Accordingly, it is an object of the present invention to provide a connecting assembly for a fuel tank including suction and return lines which obviates the disadvantages of the prior art.

Another object of the present invention resides in the provision of such a connecting assembly for fuel tanks which will prevent any air bubbles returned through the return line from reaching the suction line, especially in connection with injection type internal combustion engines.

Still another object of the present invention is the provision of such a connecting assembly which reduces the cost of manufacture and simplifies the sealing problem connected therewith when installed in a fuel tank.

A still further object of the present invention is the provision of such an arrangement of a suction and return line which enables simultaneous installation thereof due to the fact that a single connecting member, such as a unitary casting, is used to support thereon these two lines so as to simplify assembly and repair while at the same time preventing undesirable interaction of the returned fuel mixture with the fuel to be drawn in by the suction line, especially in connection with internal combustion engines having fuel injection systems.

These and further objects, features and advantages of the present invention will become more obvious from the following description when taken in connection with the accompanying drawing which shows, for purposes of illustration only, several embodiments in accordance with the present invention and wherein:

Figure 1 is an elevational view of a connecting assembly adapted to be installed in a fuel tank for the removal of fuel from a fuel tank provided with a suction and return line, Figure 2 is a cross-sectional view taken along line 2—2 of Figure 1 on an enlarged scale, Figure 3 is a cross-sectional view, similar to Figure 2, of a different embodiment in which the discharge surface of the return line is shaped differently from that indicated in Figure 2, Figures 4a, 4b, and 4c illustrate schematically the operation of the system in accordance with the present invention with different levels of fuel in the fuel tank into which extends the connecting assembly for the removal of fuel in accordance with the present invention, and Figure 5 is an elevational view partly in section illustrating the connecting assembly installed in a fuel tank.

Referring now more particularly to the drawing, wherein like reference numerals are used throughout the various views to designate like parts, reference numeral 1 designates a connecting member supporting the unitary assembly for purposes of removal of fuel from the tank. The connecting member 1 is secured to the fuel tank in any suitable manner and may consist of a casting, for example, a unitary casting. The connecting member 1 comprises threaded connecting studs or nipples 2 and 3, a vertical suction line 4 which is in communication with the threaded stud 2, and a return line 5 which is in communication with the threaded stud 3. A filter 7 formed of any suitable material, such as wire mesh, etc., is disposed about the inlet aperture or orifice 6 of the suction line 4 to prevent impurities or dirt in the fuel from reaching the suction line 4. A deflection disk or plate 8, the outer rim of which is provided with an upwardly directed bulge means or bead 9, is disposed above the filter 7. The deflection plate 8 is coaxial with the suction line 4 and is secured thereto in any suitable manner.

The return line 5 extends in the upper part thereof parallel to the suction line 4 and then leads closely adjacent to the suction line at an acute angle whereby the plane of the discharge aperture or orifice 10 thereof, as is clearly visible particularly from Figure 2, extends parallel to a plane through the central longitudinal axis of the suction line 4. The disc 8 is located below the discharge aperture 10 of the return line 5 and above the aperture 6 of the suction line 4, the aperture 10 being spaced from the aperture 6.

Figure 3 illustrates a modification which shows that the discharge aperture 11 of the return line 5 may also be shaped in such a manner that every part of the discharge aperture cross section 11 has a constant distance to the periphery 12 of the suction line 4.

*Operation*

The operation of the present invention under different fuel tank conditions is as follows:

Figure 4a illustrates the conditions in which the fuel level 13 is such as to correspond to an almost completely filled fuel tank 14. The level 13 of the fuel under these conditions lies above the discharge orifice of the return line 5.

The fuel admixed with air which is discharged from the discharge orifice of the return line 5 and the flow pattern of which is indicated by the stream lines 15, comes to lie or rest against the suction line 4 along which it flows off until it is deflected by the deflection disk 8 in the direction toward the side walls 14 of the fuel tank. The fuel stream 16 resulting from this flow or movement of the returned fuel stream thus runs concentrically toward the suction line 4 in the upper part of the tank and thereby holds together the air bubbles, which may have become separated in the meantime from the return stream, at the fuel level 13 in direct proximity of the suction line 4 so that no danger exists that these air bubbles ever reach the orifice or inlet aperture 6 of the suction line 4.

Figure 4b indicates the condition in which the fuel level 13 lies approximately at the height of the deflection disk 8. Insofar as air bubbles still exist in the return stream 15 after impingement thereof on the suction line 4 and on the deflection disk 8, these air bubbles are deflected by the deflection disk 8 toward the side walls 14 of the fuel tank. This movement is supported and aided by the stream lines or flow 17 so that the air bubbles, until disintegration thereof, are kept away from the inlet aperture 6 of the suction line 4.

Figure 4c illustrates the condition in which the fuel level 13 is disposed below the deflection disk 8. Under these conditions, with impingement of the return stream 15 on the deflection disk 8, an approximately spherically-shaped fuel screen or haze is produced which also keeps the air bubbles contained therein a relatively great distance away from the orifice 6 of the suction line 4.

While I have shown and described several preferred embodiments in accordance with the present invention, it is understood that the same is not limited thereto but is susceptible of many changes and modifications within the spirit of the present invention, and I intend to cover all such changes and modifications except as defined by the appended claims.

I claim:

1. A fuel tank and a connecting assembly therefor to provide removal of fuel from said fuel tank in motor vehicles, particularly in motor vehicles operated by injection-type internal combustion engines comprising a suction line and return line forming part of said assembly and extending into said fuel tank from above, said return and suction lines being provided with a discharge aperture, and an inlet aperture, respectively, said suction line including a deflection disk located above said inlet aperture, and the discharge aperture of said return line being arranged closely adjacent said suction line and facing the same at a point above said deflection disk and so oriented that the return flow of fuel is directed generally from said discharge aperture generally against said suction line and therealong in the direction toward said deflection disk.

2. The combination according to claim 1, wherein the discharge aperture of said return line is planar and extends at least approximately parallel to a plane through the center longitudinal axis of said suction line.

3. The combination according to claim 1, wherein every part of the cross section of the discharge aperture of said return line is at least at approximately the same distance from the circumference of said suction line.

4. The combination according to claim 1, wherein said deflection disk is disposed essentially horizontally and is centrally traversed by said suction line to which it is secured.

5. A fuel connecting assembly for insertion from above into a fuel tank of a motor vehicle provided with a fuel injection system comprising a suction line and a return line forming part of said assembly, each of said lines being provided with an orifice, at least portions of said lines adjacent the orifices extending at an acute angle to each other, the orifice of said return line facing said suction line at a point above the suction line orifice and being spaced from the suction line only a relatively slight distance, and a deflection disk intermediate the orifices of said return and suction lines for preventing air bubbles discharged from the orifice of said return line from reaching the orifice of said suction line.

6. A fuel tank and a connecting assembly therefor to provide removal of fuel from said fuel tank in motor vehicles, particularly in motor vehicles operated by injection-type internal combustion engines comprising a suction line and a return line forming part of said assembly and extending into said fuel tank from above, said return and suction lines being provided with a discharge aperture and an inlet aperture respectively, the discharge aperture of said return line being arranged closely adjacent said suction line and facing the same at a point spaced from the inlet aperture of the latter, said return line and said discharge aperture being so oriented that return flow of fuel is directed thereby at an acute angle to the suction line, and a deflection plate secured to said suction line below the discharge aperture of said return line, said deflection plate being provided with an upwardly directed bulge means.

7. A fuel connecting means for insertion into a fuel tank of motor vehicles with fuel injection systems to enable removal and return of the fuel comprising suction and return line means provided with aperture means to draw fuel into and return fuel from said injection system respectively, said aperture means being vertically spaced from each other, said suction line means and said return line means, at least adjacent said aperture means, extending substantially vertically and at an acute angle to each other, said fuel return aperture means being spaced closely adjacent said suction line so as to discharge fuel at an acute angle directly against said suction line and deflection means secured to one of said lines and projecting at least in part transversely between said aperture means to prevent air bubbles discharged from said fuel return aperture means from reaching the aperture means for said suction line.

(References on following page)

References Cited in the file of this patent

UNITED STATES PATENTS

| | | |
|---|---|---|
| 1,055,549 | McIntosh | Mar. 11, 1913 |
| 2,037,994 | Neubauer | Apr. 21, 1936 |
| 2,157,737 | Janssen | May 9, 1939 |
| 2,323,525 | Ebel et al. | July 6, 1943 |
| 2,409,965 | Udale | Oct. 22, 1946 |
| 2,590,754 | Cline | Mar. 25, 1952 |
| 2,599,699 | Dilworth et al. | June 10, 1952 |
| 2,695,679 | Hoffman et al. | Nov. 30, 1954 |
| 2,705,053 | Morris | Mar. 29, 1955 |

FOREIGN PATENTS

| | | |
|---|---|---|
| 513,934 | France | Nov. 8, 1920 |
| 744,556 | France | Jan. 26, 1933 |
| 293,758 | Great Britain | Aug. 8, 1929 |